(12) United States Patent
Watson et al.

(10) Patent No.: US 7,722,237 B2
(45) Date of Patent: May 25, 2010

(54) ILLUMINATING DEVICE AND ASSEMBLY FOR ILLUMINATING ENCLOSED SPACES USING THE SAME

(75) Inventors: David Alan Watson, Dunrobin (CA); Linda Lee Pond, Smith Falls (CA); Rhonda Renee Puckett, Carleton Place (CA)

(73) Assignee: Lumincity Inc., Carleton Place, Ontario (CA)

( * ) Notice: Subject to any disclaimer, the term of this patent is extended or adjusted under 35 U.S.C. 154(b) by 0 days.

(21) Appl. No.: 11/637,038

(22) Filed: Dec. 12, 2006

(65) Prior Publication Data

US 2007/0133210 A1 Jun. 14, 2007

Related U.S. Application Data

(60) Provisional application No. 60/749,616, filed on Dec. 13, 2005.

(51) Int. Cl.
*F21V 5/00* (2006.01)
*F21V 7/04* (2006.01)

(52) U.S. Cl. ............. 362/559; 362/154; 362/155; 362/253; 362/555; 362/558; 362/311.01; 362/311.02; 362/311.03; 362/311.04; 362/311.05; 362/311.06; 362/604; 362/605; 362/812

(58) Field of Classification Search ............. 362/186, 362/812, 154–155, 157, 227, 234, 253, 276, 362/551, 555, 558–559, 604–605; 40/546
See application file for complete search history.

(56) References Cited

U.S. PATENT DOCUMENTS

| 2,206,094 | A | | 7/1940 | Hobbs | |
|---|---|---|---|---|---|
| 2,336,677 | A | | 12/1943 | Frey | |
| 3,692,992 | A | | 9/1972 | Bain | |
| 4,316,239 | A | | 2/1982 | Cass | |
| 5,477,428 | A | | 12/1995 | Brown | |
| 5,664,867 | A | | 9/1997 | Martin et al. | |
| 5,950,340 | A | * | 9/1999 | Woo | 40/564 |
| 6,550,952 | B1 | * | 4/2003 | Hulse et al. | 362/555 |
| 6,761,468 | B1 | * | 7/2004 | Bogal | 362/208 |
| 6,762,734 | B2 | | 7/2004 | Blotky | |
| 6,851,820 | B2 | * | 2/2005 | Choi et al. | 362/92 |
| 2002/0043012 | A1 | * | 4/2002 | Shibata et al. | 40/546 |

* cited by examiner

*Primary Examiner*—Sandra L O'Shea
*Assistant Examiner*—Sean P Gramling
(74) *Attorney, Agent, or Firm*—Victoria Donnelly; IP-MEX Inc.

(57) ABSTRACT

A self-contained illuminating device for mounting on or in a closed container for illuminating both the enclosed space of the container and an area of the device which has an insignia or graphic imposed thereon, e.g. for advertising purposes. The device has a shell made of a translucent material and a miniature light source. The shell is adapted to function as an optical waveguide for propagating light emitted by the light source down the shell while simultaneously illuminating surfaces of the shell bearing the advertisement. Additionally, the shell may include a light scattering element for distributing light at a periphery of the shell. The illuminating device comprises a circuitry, including a position-sensitive switch, e.g. a tilt switch, for activating the light source dependent on the position of the device.

20 Claims, 6 Drawing Sheets

ILLUMINATING DEVICE AND ASSEMBLY FOR ILLUMINATING ENCLOSED SPACES USING THE SAME

RELATED APPLICATIONS

The present patent application claims priority from the U.S. provisional patent application Ser. No. 60/749,616 to David Watson et al. entitled "AN ILLUMINATING DEVICE AND A METHOD FOR ILLUMINATING ENCLOSED SPACES USING THE SAME" filed on Dec. 13, 2005, which is incorporated herein by reference.

FIELD OF THE INVENTION

This invention relates to illuminating devices, and more particularly to the illuminating device and assembly for illuminating enclosed spaces while highlighting a mark, advertisement, insignia or the like.

BACKGROUND OF THE INVENTION

Numerous attempts have been made to design various devices having a light source and switch assembly for illuminating enclosed spaces, for example, for illuminating the rear compartment of a motor vehicle upon opening movement of the compartment lid, a reading material for reading in bed, or a toilet seat at night upon lifting the toilet seat cover.

Examples of such devices are described below.

U.S. Pat. No. 5,477,428 (Brown) issued Dec. 19, 1995, pertains to a lamp assembly to be mounted to the underside of the hood of a vehicle hood or trunk lid to illuminate a compartment of the vehicle when the hood or trunk lid is raised. The device uses a gravity-actuated switch to make turning the lamp on/off fully automatic.

U.S. Pat. No. 4,316,239 (Cass) issued Feb. 16, 1982 discloses a lamp assembly to be mounted on the trunk lid, which includes the gravity-actuated switch for automatically illuminating the trunk when the trunk lid is elevated.

U.S. Pat. No. 3,692,992 (Bain) issued Sep. 19, 1972 strives to provide a universal solution for the problem of automatic illumination of any kind of enclosure. It provides a lamp and switch assembly for illuminating an enclosure having an opening closable by a movable member pivotable between an open position and closed position. The preferred embodiment addresses the needs of motor vehicle operators, providing an illumination solution for a rear compartment of the vehicle.

U.S. Pat. No. 2,206,094 (Hobbs) issued Jul. 2, 1940 provides a lamp and a gravity-actuated switch assembly for illuminating a compartment when a closure member is opened, and turn off the source of illumination when the closure member is moved to a closed position. Its preferred embodiment relates to the engine compartment of a vehicle.

U.S. Pat. No. 2,336,677 (Frey) issued Dec. 14, 1943 addresses automatic illumination of a reading material for reading in bed. It describes a lamp and gravity-actuated switch assembly, normally concealed behind the headboard, for illuminating a book when the lamp is in visible position, and for turning off the source of illumination when the lamp is moved to a concealed position.

U.S. Pat. No. 5,664,867 (Martin) issued Sep. 9, 1997 provides a design for automatic illumination of a toilet seat at night. A nightlight is provided that is responsive to movement so that when the toilet seat is lifted up, the light turns on, and when the seat is lowered, the light turns off. The light is turned on/off automatically by means of a tilt-sensitive switch.

U.S. Pat. No. 6,851,820 (Choi) issued Feb. 8, 2005 describes a light for a barbecue grill, which has a housing mounted to the lid of the barbecue grill, a light source, power source, a controller and a switch. The switch manipulates illumination of the light source when the lid of the barbecue grill is lifted.

U.S. Pat. No. 6,762,734 (Blotky) issued Jul. 13, 2004 proposes to use the outside surface of various types of containers for displaying images related to the content of the containers. The intent is to turn the containers into advertising vehicles for the product inside of the container. The implementation concentrates on using beverage cans as containers, and light emitting polymer films (LEPF) as a medium for illuminating the surface and displaying images onto. The electronic circuitry is rather sophisticated and includes a microprocessor and various sensors for detecting the opening of the container by a user. Opening of the container is used as a signal to start surface illumination, displaying images and providing other advertising activities, e.g. sound etc.

In spite of the numerous attempts to design various devices for illuminating enclosed spaces, the need still exists for a simple, cost effective and easy-to-manufacture device for illuminating enclosed spaces, the device having additional functionality or utility e.g. carrying information or displaying an insignia, and preferably utilizing a self-contained low-energy power source.

SUMMARY OF THE INVENTION

In accordance with one aspect of the invention, there is provided an illuminating device comprising:

a shell having two surfaces, a periphery and a first translucent portion to be illuminated, and a light source disposed for emitting light into the shell for propagating between the surfaces by internal reflection, the shell comprising a waveguide for propagating a part of light emitted by the light source towards the first translucent portion of the shell, and for propagating a part of light emitted by the light source to a range of space outside the shell. The waveguide may extend from the light source to the first portion of the shell. In an embodiment of the invention, the waveguide extends from the light source to the periphery of the shell.

In the embodiment of the invention, an advertisement, insignia, symbol, graphics, logo or mark, hereinafter termed "insignia", may be disposed on the first portion of the surface, the insignia etc. to be illuminated by the light propagating through the waveguide. The insignia may be attached, releasably or permanently, to one of the surfaces of the shell or embedded in the shell.

In the embodiment of the invention, the light source is disposed so as to face a side face of the shell such that light energy emitted by the light source is coupled into the shell between the two surfaces, thereby defining a planar waveguide.

In the embodiment of the invention, the illuminating device comprises a light scattering element, which is optically coupled with the waveguide for distributing light to the outside of the shell. The scattering element may be disposed along the periphery of the shell. Alternatively, the scattering element may be embedded in the waveguide. The scattering element may be selected from the following: a diffraction grating, glass spheres, plastic spheres, prisms, lenses or disturbances in the surface of the shell.

The light source may be a light emitting diode. Preferably, it is embedded in the shell so that light emitted by the diode is coupled into the waveguide.

Advantageously, the waveguide is formed by the material and the surfaces of the shell.

The device may further comprise a position sensitive switch for turning the light source on or off depending on a spatial orientation of the switch.

In accordance with another aspect of the invention, there is provided an illuminating device which comprises:
- a substantially translucent shell having a first end a second end,
- a light source disposed at said first end so that light emitted by the source propagates down the shell and towards said second end, and
- a scattering element disposed at said second end for receiving the light propagating towards said second end and scattering the received light into a spatial angle outside the shell near the second end of the shell.

In accordance with still another aspect of the invention, there is provided an assembly, comprising:
- the illuminating device as defined above, and a container having a movable lid and an enclosed space to be illuminated, wherein the illuminating device is mounted on the movable lid of the container, the illuminating device including a circuitry for turning the light source "ON" when the movable lid is in an open position, thus simultaneously illuminating the enclosed space of the container and the shell of the illuminating device.

In the embodiment of the invention, the circuitry comprises a tilt switch for activating the light source depending on a spatial position of the switch. The light source may be at least one light emitting diode or it may be selected from one of the following: a light emitting diode, a color-changing diode, a small format incandescent light, organic light, cold-cathode fluorescent light, electro-luminescent light, a laser, a laser diode or a phosphor light.

Thus, the illuminating device of the embodiment of the invention, when mounted on the lid, provides a dual functionality of simultaneously illuminating the enclosed space of the container and the shell of the illuminating device.

BRIEF DESCRIPTION OF THE DRAWINGS

The embodiment of the invention will now be described, by way of example, with reference to the accompanying drawings in which.

DETAILED DESCRIPTION OF EMBODIMENTS OF THE INVENTION

Figure 1A:
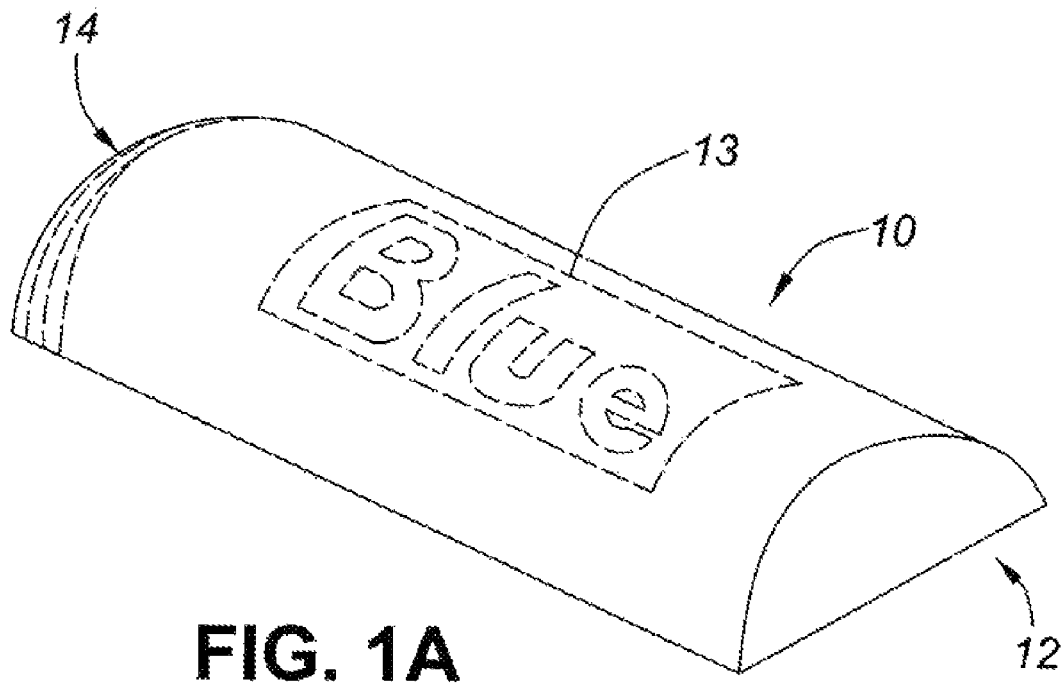
FIG. 1A is an isometric view of the illuminating device according to the embodiment of the invention.
Figure 1B:
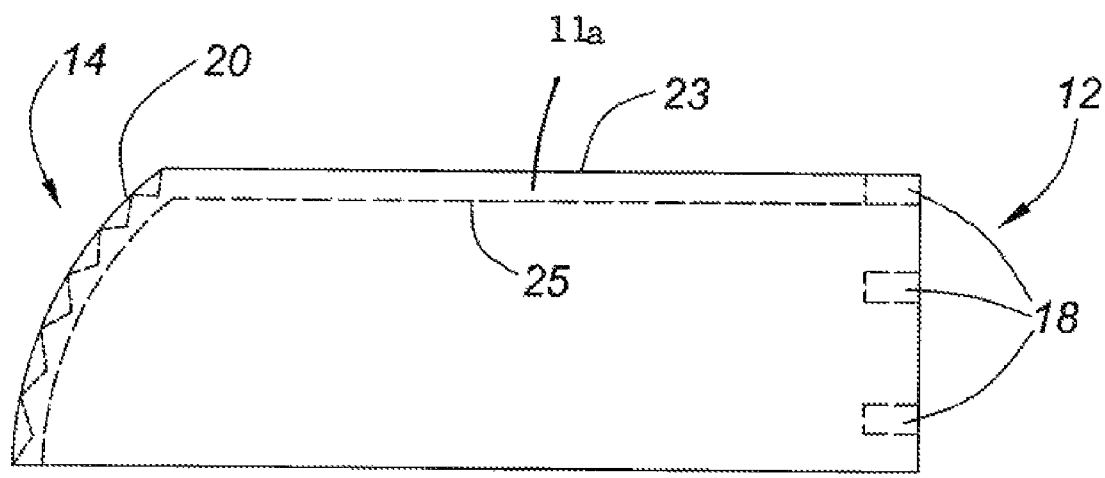
FIG. 1B shows an exploded view of the illuminating device of FIG. 1A.
Figure 1C:
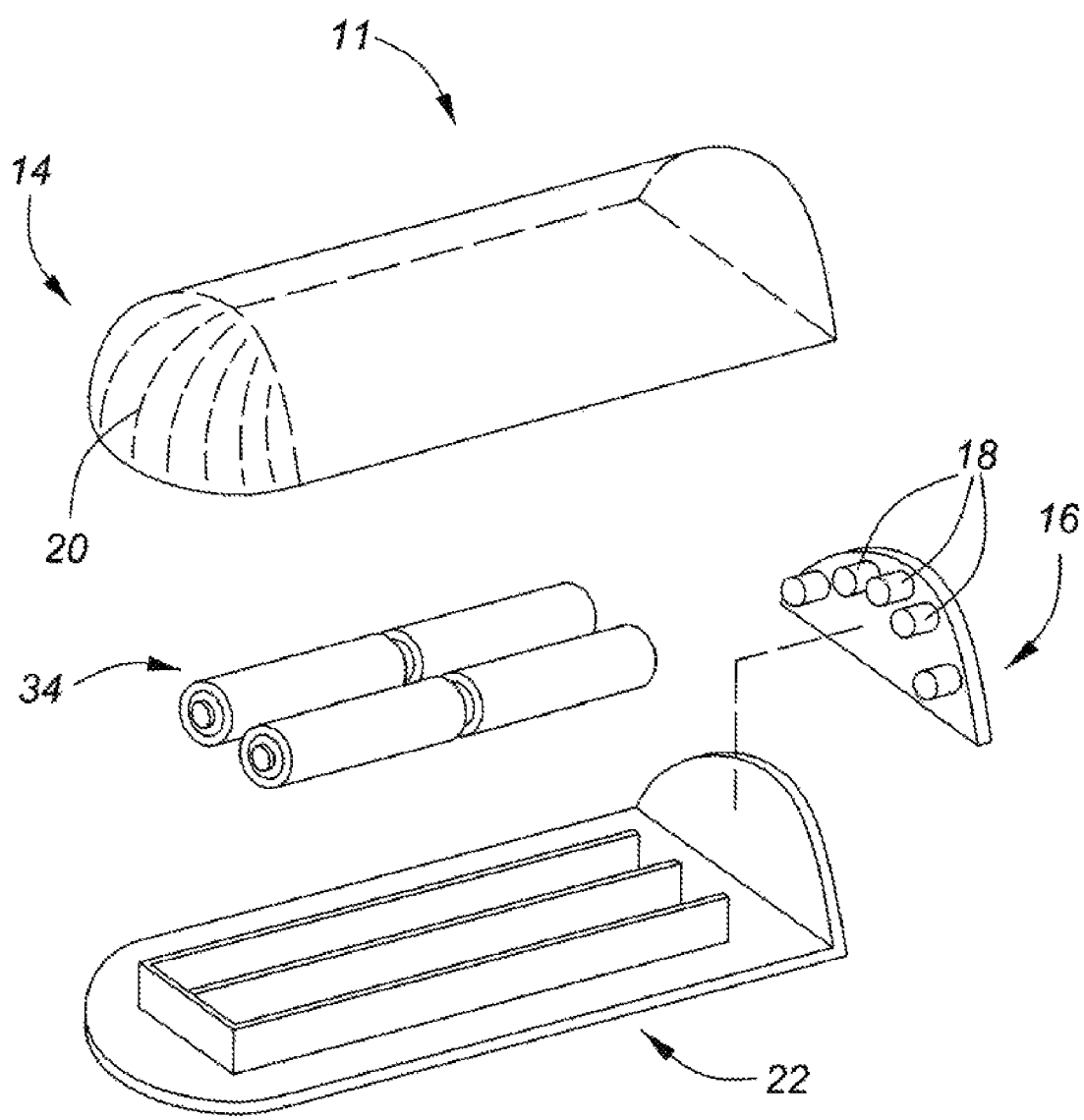
FIG. 1C shows a side view of the illuminating device of FIG. 1A.

As illustrated in FIGS. 1A - 1C, the illuminating device 10 has a substantially translucent shell 11, having a first end 12 and a second end 14. The device further includes a printed circuit board (PCB) 16 mounted at the first end 12, including a light source 18 comprising one or more light emitting diodes (LEDs) 18, batteries 34 and a required circuitry to operate the LEDs, described hereinbelow. The LEDs 18 are disposed at the first end 12 so as to make the light emitted by LEDs 18 to propagate down the shell 11 and towards the second end 14 between an outer surface 23 and inner surface 25 of the shell 11.

A light scattering element 20, e.g. in the form of shell surface disturbances, plastic spheres, glass spheres or a diffraction grating etc. is disposed at the second end 14 for receiving the light propagated towards the second end 14 from the first end 12 and scattering (dispersing) the received light into a spatial angle outside of the shell 11. For the purposes of embodiments of the invention, the spatial angle is preferably smaller than $2\pi$ steradians.

Thus, the shell 11 of the illuminating device 10 forms a light pipe or waveguide 11a between its outer surface 23 and inner surface 25 for transmitting light from the LEDs 18 to the second end 14 of the illuminating device 10. The shell 11 can be conveniently made of a translucent plastic such as polypropylene or polystyrene, or any other substantially translucent and preferably light material of similar physical properties. The shell 11 does not have to be entirely translucent, but it should have at least a first translucent region for placing therein an insignia or advertising material to be illuminated. The insignia or advertising material may be disposed on or make part of the shell 11 of the illuminating device 10, e.g. it may be disposed, fixedly or preferably releasably, on an outer 23 or inner 25 surface of the shell 11, or it can be embedded in the shell 11.

Thus, when LEDs 18 are in operation, the advertising material is illuminated with the light propagating down the shell 11 between its outer and inner surfaces, thereby the material of the shell and its surfaces forming a "leaky" light waveguide 11a.

The thickness of the shell, if made of plastic, is preferably within the range from about 0.5mm to about 6mm. In the embodiment described herein, the thickness of the shell was about 3 mm (0.12 in), i.e. comparable with the diameter of a conventional LED.

Alternative light sources may be employed instead of, or additionally to, LEDs, for example, incandescent (small format) light, organic, cold-cathode fluorescent, laser, phosphor light, electro-luminescent light and other conventional light sources.

Figure 2:
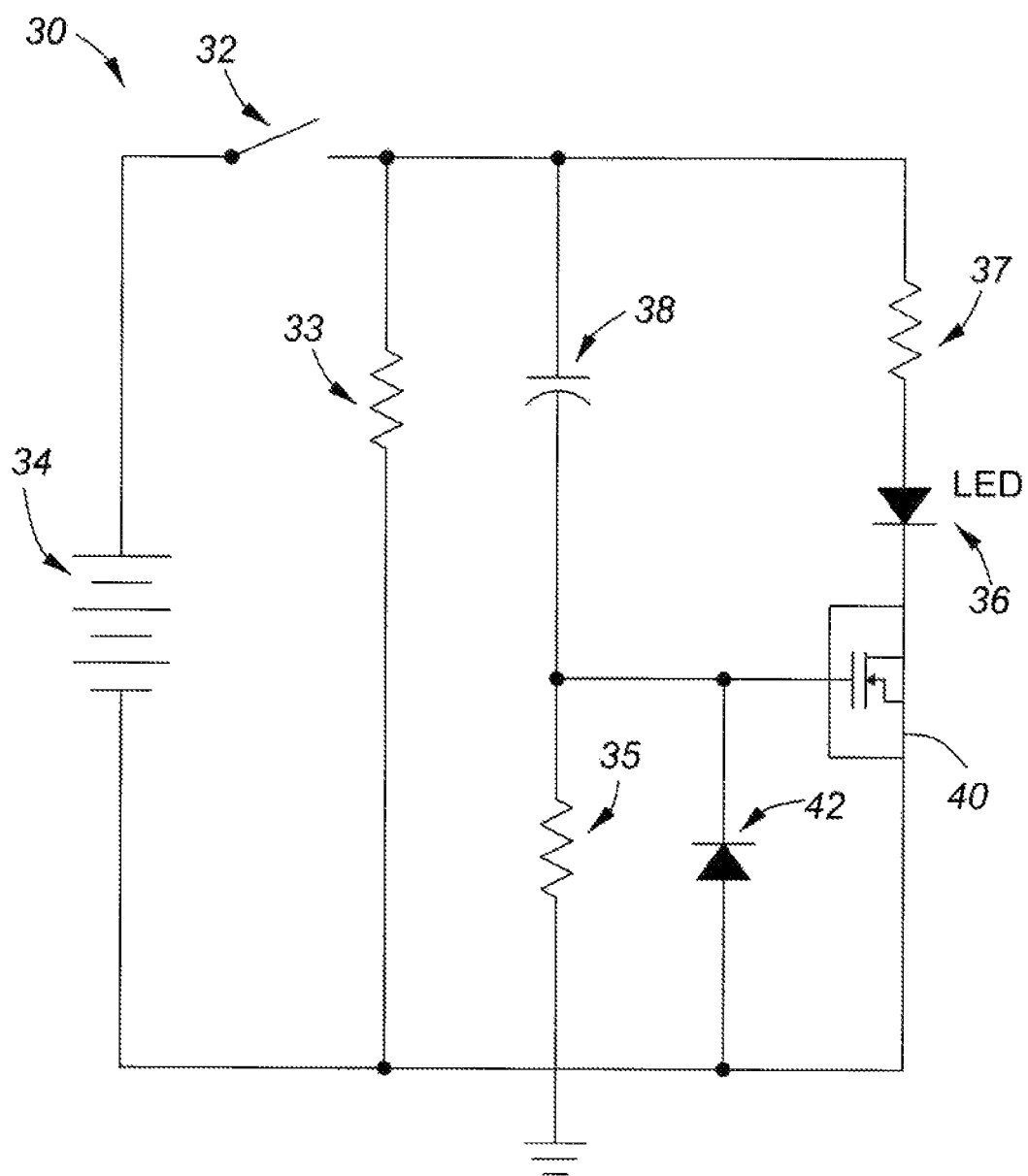
FIG. 2 illustrates a circuitry for use in the illuminating device of FIG. 1A.

FIG. 2 shows a circuitry 30 mounted on the PCB 16 for operating the illuminating device of FIGS. 1A-1C. It includes a tilt switch 32, resistors 33, 35 and 37, a battery 34 (which is conveniently stored in the casing 22 of the shell 11 of the illuminating device 10 as shown in FIG. 1C), a LED 36, a capacitor 38 and a transistor 40. The resistor 37 limits current through the LED 36. The transistor 40 controls current flow through the LED 36. The capacitor 38 combined with resistor 35 determines how long the transistor 40 stays on after the tilt switch 32 closes. Once the capacitor 38 is fully charged, the transistor 40 shuts off as resistor 35 pulls the gate to ground.

Figure 3:
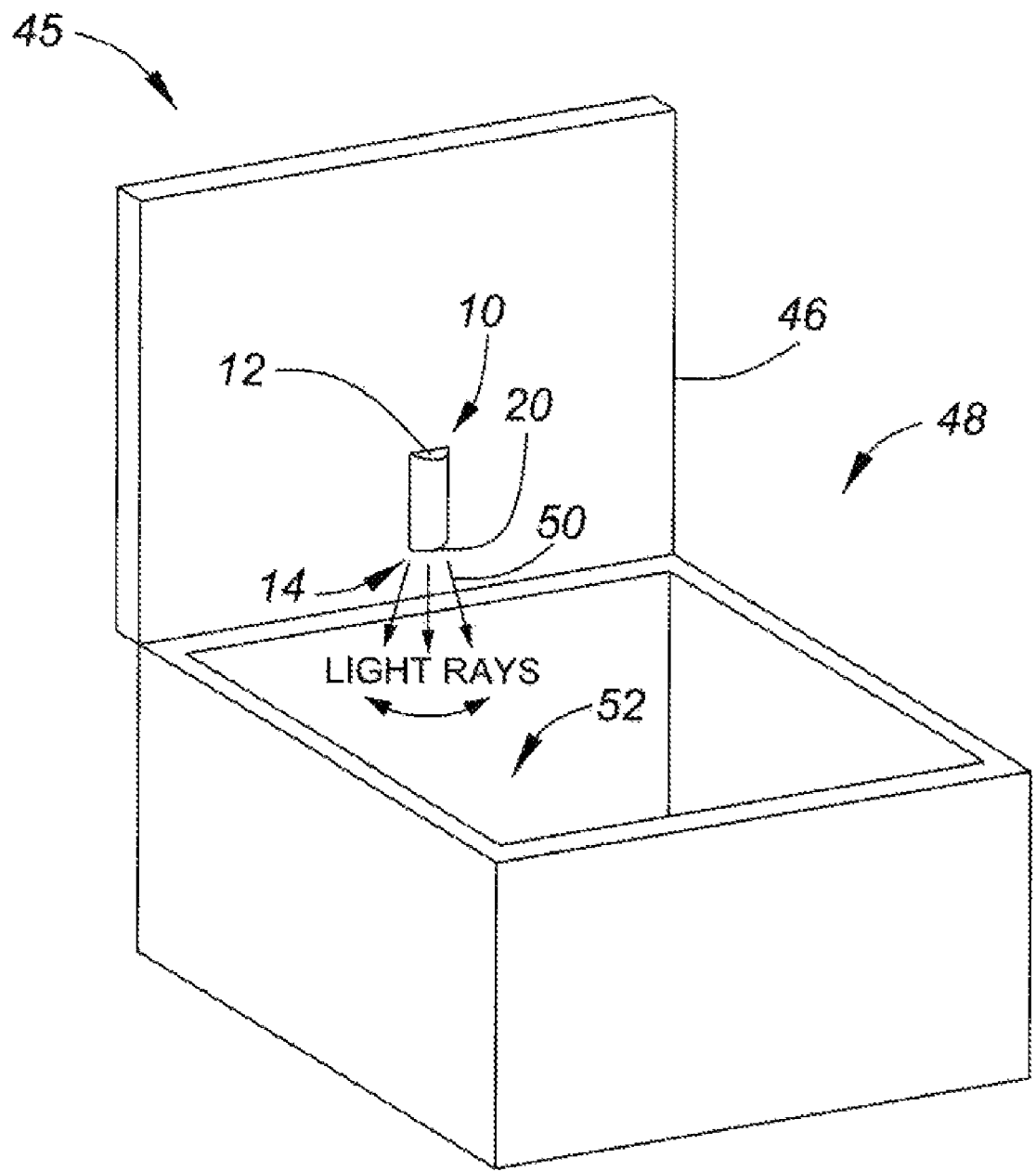
FIG. 3 illustrates an assembly of the illuminating device and a container whose enclosed space is to be illuminated.

When the tilt switch opens, as will happen in a scenario illustrated in FIG. 3, the capacitor 38 discharges through resistors 33 and 35. An optional diode 42 is provided to offer a faster discharge path for capacitor 38.

It is conceivable, alternatively, to connect resistor 37 directly to the battery so that the resistor receives power all the time, and connect the tilt switch only to resistor 33 and capacitor 38. This modification offers the advantage or passing a relatively low current through the tilt switch 32. It is also conceivable to install, if so desired, a manual switch (not illustrated) beside the tilt switch.

FIG. 3 illustrates an assembly 45 of the illuminating device of the embodiment of the invention and a container to be illuminated. The illuminating device 10 is mounted (e.g. by means of Velcro® or other conventional means) on the lid 46 of a container 48, so that the light emitted by the LED(s) 18 exits at the bottom of the device 10 as indicated by the arrows 50. While a typical LED has a narrow divergence angle of a light beam, in the range of a few degrees, the light beam becomes expanded to a degree as it travels inside the shell 11 and further dispersed as it exits through the light scattering element 20 at the second end 14 of the shell 11. Preferably, in order to better use the light energy available, the light scattering element 20 should be selected so that the space illuminated by the light rays 50 is limited to preferably not more than $2\pi$ steradian in order to direct most of the light towards the enclosure 52.

Figure 4:
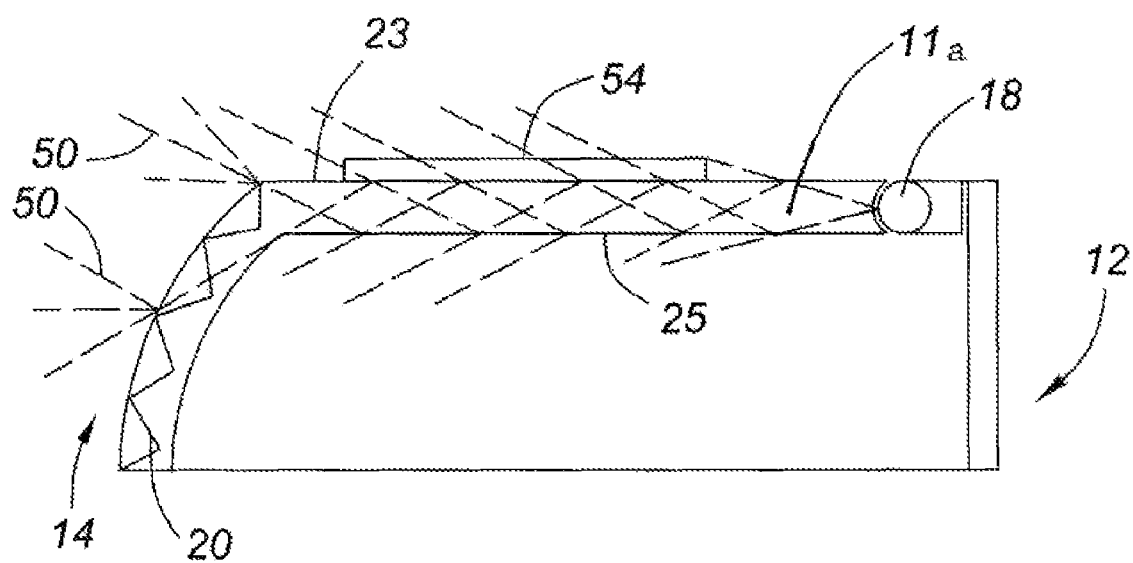
FIG. 4 shows a light ray diagram for light emitting diode embedded into the shell of the illuminating device of FIG. 1A.

FIG. 4 serves to illustrate the light guiding mechanism used in the embodiment of the invention. As described earlier, the plastic shell 11 forms a light pipe, or more specifically, a planar waveguide 11a, for propagating light between the outer 23 and inner 25 surfaces of the shell 11 by internal reflection (more specifically, by frustrated total internal reflection), where a part of light is propagating down the shell 11 toward the second end 14, and a part of light is leaving the waveguide 11a, thus illuminating the outer 23 and inner 25 surfaces of the shell 11.

Thus, the light is conducted from the light source 18 down the shell 11, being at least partly contained inside the shell 11, to illuminate, by scattering, the first translucent portion of the shell (exemplified by a region 13 in FIG. 1A) and any insignia or graphics or advertising material 54 that could be disposed in the region 13. The scattering of light, at least in the first translucent region 13, is virtually inevitable when the shell 11 has no cladding and thus forms a "leaky" waveguide 11a unlike an optical fiber having a core and a cladding.

The light then hits the light scattering element 20 at the second end 14 of the shell 11 and illuminates the enclosed space of the container 48. The light scattering element 20 may comprise, for example, a plurality of plastic or glass spheres, prisms and/or lenses oriented randomly, or other similar optical elements, which would provide re-direction of the light received at the second end 14 of the shell 11 and scattering it into a spatial angle sufficient to illuminated the dark enclosed space of the container 48. Conveniently, the light scattering element 20 may be molded into the bottom part of the shell 11 at its end 14.

In the embodiment of the invention illustrated in FIG. 4, the shell 11 functions both as a light waveguide 11a means for delivering light energy to the insignia 54 in the region 13 and as a light waveguide 11a means to supply light for illuminating an enclosed space 52 outside the illuminating device 10. It is conceivable, however, to provide separate optical waveguides (optical paths) from the light source 18 to the region 13 and to the outside of the shell 11. It is also easily conceivable to provide a cladding (or opaque coating) to parts of the surfaces of the shell to avoid losses of light outside the desired areas.

As illustrated in FIG. 4, the LED(s) 18 is a standard diode with its own built-in lens installed about the lateral face of the shell so as to inject light into the material between the outer 23 and inner 25 surface of the shell that thus function as a planar waveguide 11a. It is also possible, though not illustrated, to use a "raw" LED without a built-in lens, which has a much wider divergence angle, to be embedded into the material of the shell 11 to form an integral unit.

Figure 5A:
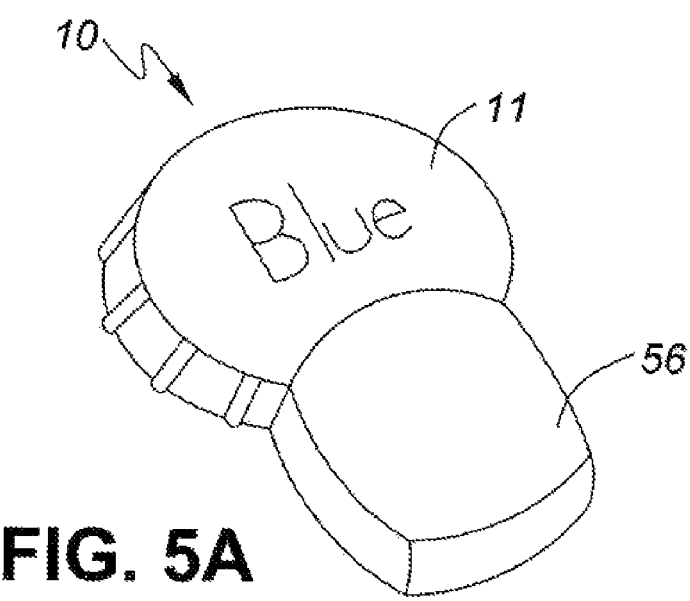
FIG. 5A is a perspective view of the illuminating device according to another embodiment of the invention.
Figure 5B:
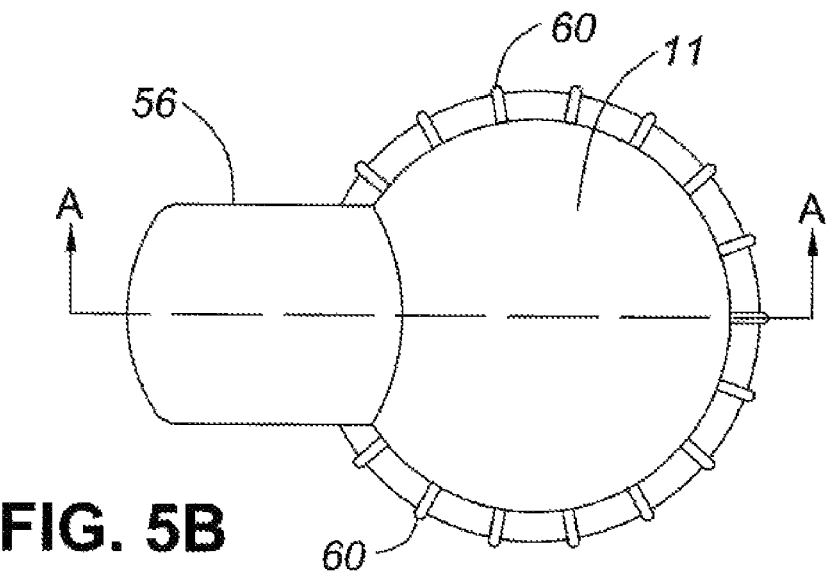
FIG. 5B is a top view of the illuminating device of FIG. 5A.
Figure 5C:
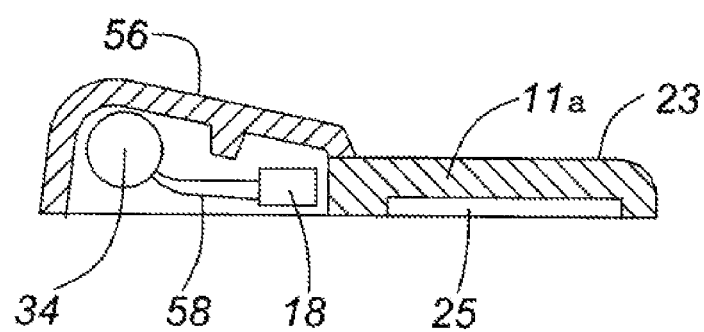
FIG. 5C is a cross-sectional view along the line A-A of FIG. 5B.

Turning now to FIGS. 5A-5C, another embodiment of the illuminating device 10 has a casing 56 attached to a shell 11 that is made of a translucent plastic and shaped, for advertising purposes, as a beer bottle cap. The shell 11 has an outer surface 23 and inner surface 25, which form a waveguide 11a, and a periphery of the beer cap-shaped shell having indentations 60, the indentations serving as the light scattering element 20. If required, additional scattering elements may be embedded in the material of the waveguide 11a, e.g. glass or plastic beads, small prisms or randomly oriented lenses, pieces of glass or plastic etc., to increase light scattering inside the waveguide 11a, thus increasing the amount of light leaving the waveguide 11a to the outside of the shell 11. In the illuminating device of FIGS. 5A-5C, the entire outer 23 and inner 25 surfaces of the shell 11 are substantially illuminated, thus forming the first translucent portion 13 of the shell 11 to be illuminated. The casing 56 houses a light source 18 (comprising a single LED 18), and a PCB, comprising a circuitry similar to that of FIG. 2 described above for operating the illuminating device 10 (only battery 34 and electric leads 58 of the circuitry being shown). It will be noted that, similarly to the arrangement shown in FIGS. 1B, 1C and FIG. 4, the light LED 18 is situated so as to emit light into the material between the outer 23 and inner surfaces 25 of the shell 11, wherein the shell 11 forms a waveguide 11a.

The illuminating device 10 can be used in combination with various containers having enclosed spaces to be illuminated, e.g. camping coolers, tool chests, and emergency response kits et al.

It is the advantage of the illuminating device 10 and the assembly 45 of the illuminating device and the container 48 that the illuminating device 10 can operate with a relatively low-energy light source, for example a LED powered by a battery, and yet, owing to the specific structure of the device, the available light energy is used effectively to simultaneously illuminate, when the device is mounted on the lid of the container, the shell 11 of the device 10 which may contain an advertising material, marks or insignia, and the enclosure 52 of the container 48.

Although specific embodiments of the invention have been described in detail, it will be apparent to one skilled in the art that variations and modifications to the embodiments may be made within the scope of the following claims.

For example, the light source may be adapted to change properties e.g. a colour-changing light emitting diode or multiple diodes may be employed. Also, it is conceivable to embed a waveguide, e.g. a glass or plastic waveguide, into the shell to fulfil the functionality of the invention, rather than to use the shell as the waveguide. It will be appreciated that the functionality can be achieved either by using an imperfect waveguide (the shell in the embodiment of the invention) with inherent "leakage" of light, or using an efficient traditional waveguide with core and cladding and having frustrated regions to allow the light leak from the waveguide.

What is claimed is:

1. An illuminating device, comprising:
 (a) a shell having:
  (i) a first end and a second end defining a longitudinal axis of the shell between the first end and the second end;
  (ii) a surface layer enclosing a space and extending between the first end and the second end, the surface layer having substantially smooth outer and inner surfaces forming an optical waveguide extending between the first end and the second end, wherein said outer and inner surfaces are capable of providing multiple total internal reflections (TIRs) of light between the surfaces;

(b) a portion of the shell having an advertisement, insignia or mark disposed on or embedded into at least one of the outer or inner surfaces;

(c) a light source disposed at the first end for emitting light into the waveguide between the outer and inner surfaces so that a substantially larger portion of the light propagates along the longitudinal axes of the shell from the first end to the second end by multiple total internal reflections between the outer and inner surfaces, and a substantially smaller remaining portion of the light partially leaks due to frustrated TIRs through at least one of the outer or inner surfaces having the advertisement in a direction, which is lateral to the longitudinal axes of the shell; and (d) a light scattering element optically coupled to the waveguide and disposed substantially at the second end for distributing the portion of the light reaching the second end substantially along a direction of the longitudinal axis of the shell into a spatial angle outside of the shell near the second end of the shell.

2. The illuminating device according to claim 1, wherein the scattering element is disposed at the second end.

3. The illuminating device according to claim 2, wherein the scattering element is disposed at the second end and an area of the optical waveguide in the vicinity of the second end.

4. The illuminating device according to claim 1, wherein the scattering element is embedded in the waveguide.

5. The illuminating device according to claim 1, wherein the light source is at least one light emitting diode.

6. The illuminating device according to claim 5, wherein the light emitting diode is embedded in the shell.

7. The illuminating device according to claim 4, wherein the advertisement, insignia or mark is releasably attached to said at least one of the outer or inner surfaces.

8. The illuminating device according to claim 1, wherein the light scattering element is one selected from a diffraction grating, glass spheres, plastic spheres, prisms, lenses or disturbances in the surface of the shell.

9. The illuminating device according to claim 1, further comprising a position sensitive switch for turning the light source "on" or "off" depending on a spatial orientation of the switch.

10. The illuminating device according to claim 9, wherein the position sensitive switch is a tilt switch.

11. The illuminating device according to claim 1, wherein the spatial angle is less than $2\pi$ steradian.

12. An assembly, comprising:
an illuminating device, comprising:
a shell having:
  a first end and a second end, defining a longitudinal axis of the shell between the first end and the second end;
  a surface layer enclosing a space and extending between the first end and the second end, the surface layer having substantially smooth outer and inner surfaces forming an optical waveguide extending between the first end and the second end, wherein said outer and inner surfaces are capable of providing multiple total internal reflections (TIRs) of light between the surfaces;
  a portion of the shell having an advertisement, insignia or mark disposed on or embedded into at least one of the outer or inner surfaces;
  a light source disposed at the first end for emitting light into the waveguide between the outer and inner surfaces so that a substantially larger portion of the light propagates along the longitudinal axes of the shell from the first end to the second end by multiple total internal reflections between the outer and inner surfaces and a substantially smaller remaining portion of the light partially leaks due to frustrated TIRs through at least one of the outer or inner surfaces having the advertisement in a direction, which is lateral to the longitudinal axes of the shell; and
  a light scattering element optically coupled to the waveguide and disposed substantially at the second end for distributing the portion of the light reaching the second end substantially along a direction of the longitudinal axis of the shell into a spatial angle outside of the shell near the second end of the shell; and
a container having a movable lid and an enclosed space to be illuminated;
  wherein the illuminating device is disposed on the movable lid of the container so that the second end projects substantially towards the enclosed space when the movable lid is in an open position;
  the illuminating device including a circuitry for turning the light source "ON" when the movable lid is in the open position; thereby the illuminating device simultaneously illuminating the enclosed space of the container and the portion of the shell having the advertisement.

13. The assembly according to claim 12, wherein the circuitry comprises a position sensitive switch for activating the light source depending on a spatial position of the switch.

14. The assembly according to claim 13, wherein the position sensitive switch is a tilt switch.

15. The assembly according to claim 12, wherein the light source is at least one light emitting diode.

16. The assembly according to claim 15, wherein the light source is selected from one of the following: a light emitting diode, a color-changing diode, a small format incandescent light, organic light, cold-cathode fluorescent light, electroluminescent light, a laser, a laser diode or a phosphor light.

17. The assembly according to claim 12, wherein the light scattering element is one selected from a diffraction grating, glass spheres, plastic spheres, prisms, lenses or disturbances in the surfaces of the shell.

18. The assembly according to claim 12, wherein the scattering element is embedded in the waveguide.

19. The illuminating device according to claim 15, wherein the light emitting diode is embedded in the shell.

20. The assembly according to claim 12, wherein the scattering element is disposed at the second and an area of the optical waveguide in the vicinity of the second end.

* * * * *